United States Patent [19]
Germer

[11] 3,707,928
[45] Jan. 2, 1973

[54] VERTICAL RAILWAY SPRING SUSPENSION SYSTEM

[75] Inventor: John A. Germer, Doylestown, Pa.
[73] Assignee: The Budd Company, Philadelphia, Pa.
[22] Filed: Oct. 28, 1970
[21] Appl. No.: 84,692

[52] U.S. Cl............105/210, 104/139, 105/1 A, 105/171, 105/199 R, 105/453, 267/3
[51] Int. Cl............B61f 3/00, B61f 5/02, B61f 5/30
[58] Field of Search......105/2 R, 171, 174, 210, 211, 105/212, 213, 1 A, 199 R, 453; 267/3; 104/139

[56] References Cited

UNITED STATES PATENTS

| 978,517 | 12/1910 | Underwood | 105/171 |
| 1,104,196 | 7/1914 | Jenoi et al. | 105/210 |
| 2,118,127 | 5/1938 | Wulle | 105/2 R X |
| 510,277 | 12/1893 | Manier | 105/213 |

Primary Examiner—Gerald M. Forlenza
Assistant Examiner—Howard Beltran
Attorney—Thomas J. Davenport, Edward M. Farrell, John D. Sowell, Alford L. Truex, Jr. and William R. Nolte

[57] ABSTRACT

A vertical spring suspension system for transmitting loads from a carbody to a wheel-axle truck. The suspension system includes opposed leaf springs secured to opposite sides of the carbody which extend diagonally beneath the center portion of the carbody to rest on journals which support the wheel-axle unit for rotation. Roller means are provided between the lower ends of the leaf springs and the journals to enable relative movement between the ends of the springs and the truck.

5 Claims, 7 Drawing Figures

INVENTOR.
JOHN A. GERMER
BY
William R. Nolte
AGENT

INVENTOR.
JOHN A. GERMER
BY
William R. Nolte
AGENT

VERTICAL RAILWAY SPRING SUSPENSION SYSTEM

This invention relates to spring suspension systems, and more particularly to spring suspension systems for use between a carbody and a wheeled-truck movable along a track.

Heretofore in railroad practice, railcars used in intercity traffic have employed suspension systems between a truck having a bolster and the carbody. These systems have generally proved to be satisfactory where the carbodies have been of large size to carry many passengers and where the curvature of the track has not imposed large yaw forces on the suspension systems. For the local transportation of passengers however from central city locations to city airports, for example, smaller types of cars employing different suspension systems are required. It has been found in some of these systems that due to the circuitous routing to the tracks the undercarriages are subjected to large angular rotations relative to the carbody and as a result the spring suspensions are subjected to large shear forces. In the design of these smaller cars it has been found that undercarriages having bolsters have proved unsatisfactory to accommodate the large relative rotations between the trucks and the carbodies. Moreover the use of such bolsters has proved disadvantageous because of the increased weight added to the car and the increased height of the car floor above the rails.

Still other approaches have attempted to slide the springs on the underside of the carbody, but these have also failed to perform satisfactorily. To slide the springs on the underside of the carbody requires a large surface for the tops of the springs, necessitating that the sliding surfaces be well greased. In this situation the yaw resistance would be dependent on the condition of the sliding surfaces, and protective devices in the nature of boots would be necessary to keep road dirt off the sliding surfaces.

It is an object of this invention therefore to provide an improved spring suspension system for use between a carbody and a wheel truck which avoids one or more of the disadvantages of the prior art.

It is a further object of this invention to provide an improved vertical spring suspension system for a vehicle capable of tolerating large yaw angles between the body of the vehicle and its truck.

In accordance with the invention, the spring suspension system employed between a carbody and a wheeled truck comprises first and second spring means spaced from each other and having upper portions secured to opposite undersides of said carbody. Each said first and second spring means has an upper portion secured to one side of said carbody, an intermediate portion extending transversely beneath said carbody, and a lower portion extending beneath the other side of said body. Means are interposed between the lower portion of said spring means and said truck to facilitate relative movement therebetween.

For a better understanding of the invention together with other and further objects thereof reference is had to the following description taken in connection with the accompanying drawings in which.

Figure 1:
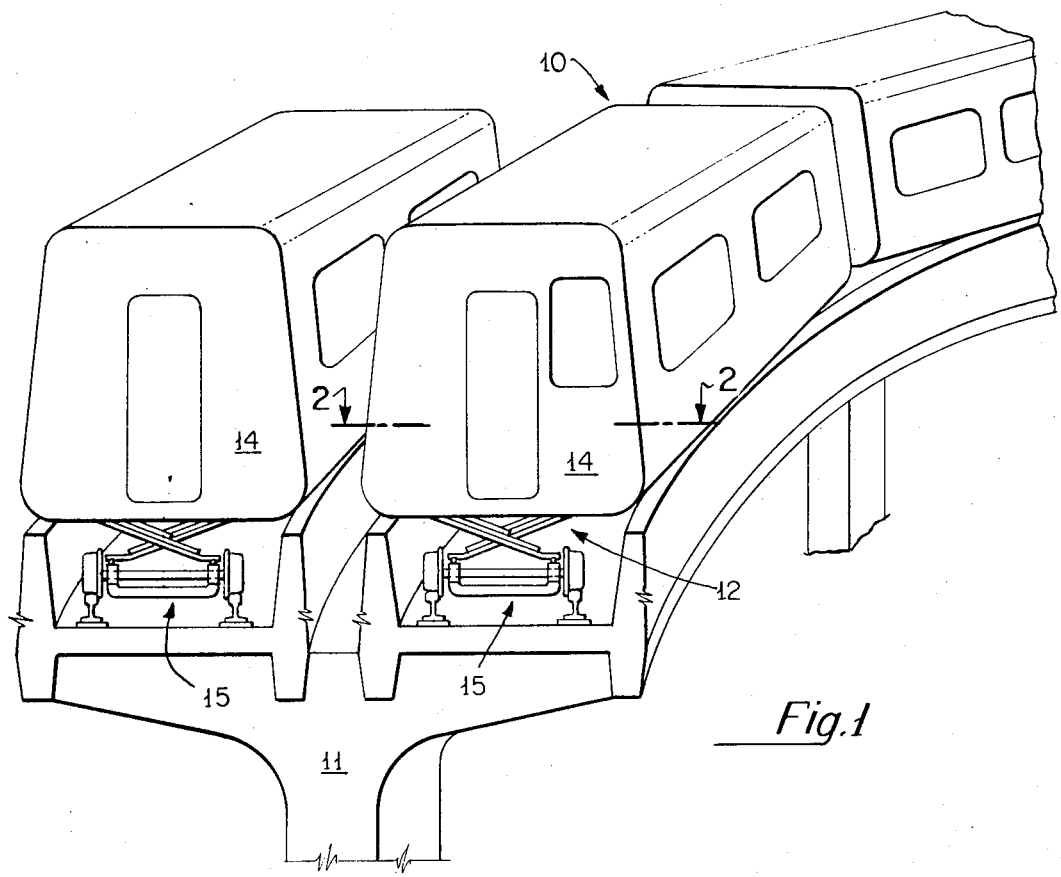
FIG. 1 is a vertical elevation view partially schematic showing a railcar on a track employing the vertical suspension system of the present invention.

Referring to FIG. 1 of the drawing, there is shown a railcar 10, partially schematic, travelling on an elevated track guideway 11. The car includes a spring suspension system 12, embodying the present invention which is interposed between the body 14 of the car and its wheeled truck 15. The spring suspension system is capable of tolerating large yaw angles.

Figure 2:
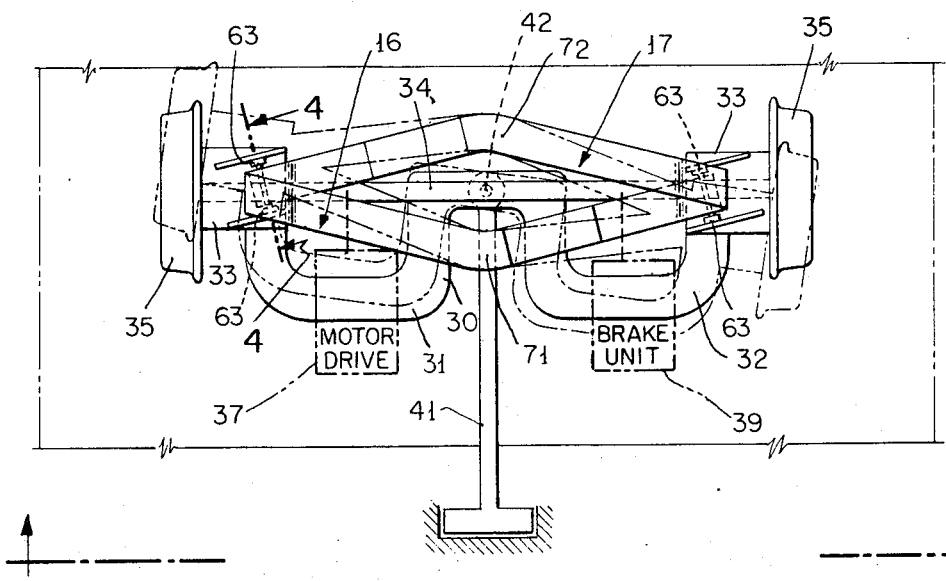
FIG. 2 is a view taken along the line 2—2 of FIG. 1 and showing a plan view of the suspension system.
Figure 3:
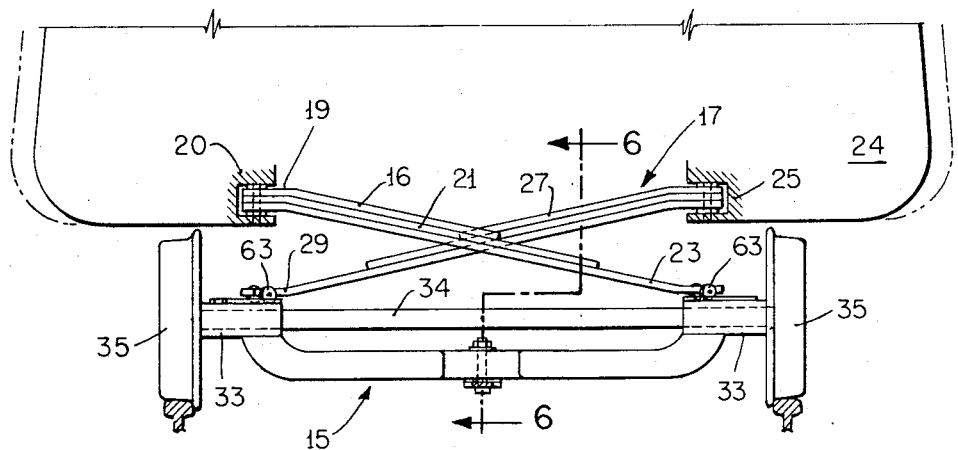
FIG. 3 is an elevation view as viewed from the line 3—3 of FIG. 2.

With reference now to FIGS. 2 and 3, the spring suspension system 12 is shown as including two cantilever leaf springs 16, 17. The top 19 end of spring 16 is shown suitably secured to the left side of body 14 as at 20 in a manner to enable spring 16 to flex vertically with changing load forces applied on the car. The spring 16 includes an intermediate portion 21 extending transversely beneath the car and a free end portion 23 which extends beneath the right hand side 24 of the car. In a similar manner leaf spring 17 is fixedly secured at its upper end to the right hand underside of the car as at 25. The spring also includes an intermediate portion 27 which extends diagonally downwardly beneath the central portion of the body of the car and terminates in a free end portion 29 which rests on the truck 15.

Figure 6:
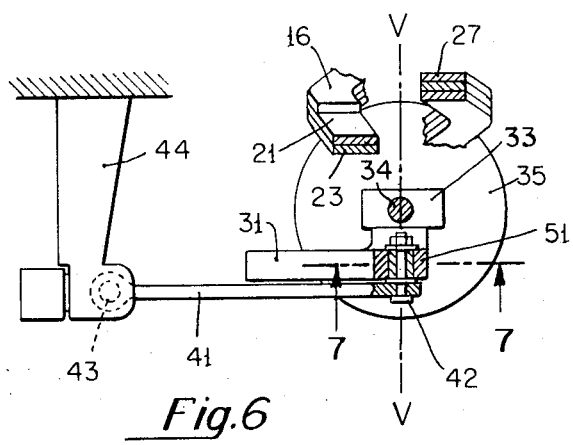
FIG. 6 is a sectional view taken along the lines 6—6 of FIG. 3.
Figure 7:
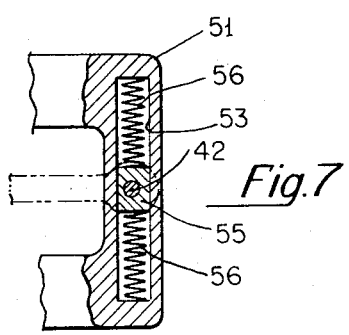
FIG. 7 is a sectional view taken along the line 7—7 of FIG. 6.

Still referring to FIGS. 2 and 3 the truck 15 includes a double U-configuration frame 30 which includes U-portions 31, 32 and end bearing journals 33 at the outer ends of the frame. The journals support axle 34 for rotation which in turn carries wheels 35. One of the U-portions 31 of the frame 30 carries a suitable motor drive 37 connected to the axle while the other U-portion 32 carries a suitable brake unit 39. The central portion of the frame at the juncture of the two U-portions is attached to tow bar 41 by means of pivot pin 42. As seen in FIG. 6 the tow bar is hinged to the carbody as at 43 to the base of downwardly projecting underframe member 44 of the carbody. The tow bar 41 is hinged from the carbody so that it is free to rotate vertically but not laterally. It is observed that the tow bar moreover is mounted horizontally and at a relatively short height above the rails to minimize the overturning movement of acceleration or braking to a minimum.

Considering the central portion 51 of the truck frame 14 in greater detail it is observed that the same normally lies in a horizontal plane and includes an elongated recess 53. The central vertical portion of the pivot 42 is surrounded by a block 55 adapted to slide back and forth in the laterally disposed recess. A pair of springs 56, one each on each side of the block and received within the recess tend to restore the truck to a central location as the same undergoes lateral excursions.

Figure 4:
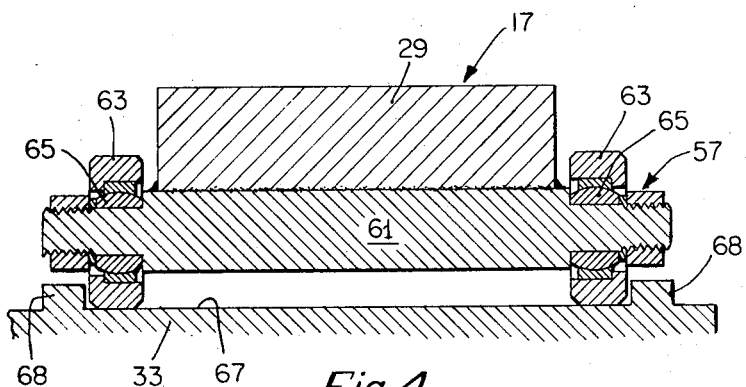
FIG. 4 is a sectional view taken along the line 4—4 of FIG. 2.
Figure 5:
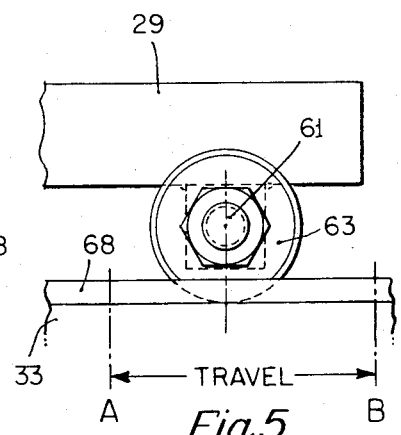
FIG. 5 is a side elevation view of the roller means illustrated in FIG. 4.

With respect now to FIGS. 4 and 5, roller means 57 are provided to enable the lower ends of the leaf spring 16, 17 to enable the same to translate or roll relative to the journals 33 of the frame 30 during lateral excursion of the truck. The springs are confined to the top of the journal 33 so that the same follow the truck 15 as the same rotates about vertical axis V—V as indicated by its movement from the full line position in FIG. 3 to its dotted line position. In order to accomplish the above rolling or sliding movement shaft 61 is suitably affixed as by welding to the under-surface of the lower portion 29 of spring 17. The outer ends of the shaft support wheels 63 by means of spherical bearings 65. The top surface of the journal 33 includes a guideway or groove 67 which confine the wheels to rolling action. Thus any rotation of the truck 15 about its vertical axis V—V causes the lower end of spring 17 to follow the truck by means of shoulders 68 at the outside margins of the journal 33. However, lateral movements of the truck 15 relative to the carbody 14, vertical suspension, or roll movements cause the spring ends 29 on shaft 61 to travel back and forth between the points A,B as indicated in FIG. 5.

In order to avoid interference between the springs 16, 17 when the truck 15 is yawed in rotation about the vertical axis V—V, the central portions 21, 27 of spring 16, 17 respectively are offset with respect to each other as at 71,72.

While there has been described what is at present considered to be the preferred embodiment of this invention, it will be obvious to those skilled in the art that various changes and modifications may be made therein without departing from the invention and it is aimed to cover all such changes as fall within the true spirit and scope of the invention.

What is claimed is:

1. A spring suspension system for supporting a carbody on the frame of a wheel-truck movable along a track, means mounting said truck to said carbody, first elongated spring means having an upper portion secured to one side of said carbody and including an intermediate portion extending transversely beneath the carbody and terminating in a lower portion lying beneath the opposite side of said carbody, second elongated spring means having a top portion secured to said opposite side of said carbody and including an intermediate portion extending beneath said carbody and crossing said intermediate portion of said first spring means with a lower portion lying beneath said one side of said carbody, and slide means engaging said lower portions of said first and said second spring means and said frame of said truck to enable relative sliding movement therebetween.

2. In the spring suspension system as set forth in claim 1 wherein said slide means include roller means interposed between said lower portion of said first and said second spring means and said frame of said truck.

3. In the spring suspension system as set forth in claim 2 wherein said roller means are secured to said lower portions of said first and said second spring means and said frame of said truck includes guide means for said roller means.

4. In the spring suspension system as set forth in claim 2 wherein said roller means include spherical bearing means to enable yawing movements of said spring means relative to said truck.

5. In the spring suspension system as set forth in claim 2 wherein said intermediate portion of said first and said second spring means are offset relative to their respective top and bottom portions.

* * * * *